H. JARVIS & M. H. BLAKESLEE.
TABULATING ATTACHMENT FOR TYPE WRITERS.
APPLICATION FILED FEB. 1, 1901. RENEWED FEB. 27, 1911.

997,622.

Patented July 11, 1911.

UNITED STATES PATENT OFFICE.

HAROLD JARVIS AND MANLEY H. BLAKESLEE, OF BUFFALO, NEW YORK; SAID BLAKESLEE ASSIGNOR TO SAID JARVIS.

TABULATING ATTACHMENT FOR TYPE-WRITERS.

997,622.  Specification of Letters Patent.  Patented July 11, 1911.

Application filed February 1, 1901, Serial No. 45,625. Renewed February 27, 1911. Serial No. 611,235.

*To all whom it may concern:*

Be it known that we, HAROLD JARVIS and MANLEY H. BLAKESLEE, citizens of the United States, residing at Buffalo, in the county of Erie and State of New York, have invented certain new and useful Improvements in Tabulating Attachments for Type-Writers; and we do hereby declare the following to be a full, clear, and exact description of the invention, such as will enable others skilled in the art to which it appertains to make and use the same.

Our present invention relates to type writing machines and has for its object the providing of a tabulating attachment for machines of that character.

The invention consists in certain novel features of construction and combinations of parts whereby an effective machine adapted to a wide range of tabulating work is secured.

The best form in which we have contemplated embodying our invention is illustrated in the accompanying drawings and our said invention is disclosed in the following description and claims.

In the said drawings, Fig. 3 is a partial longitudinal section. Fig. 7$^a$ is a partial sectional view showing manner of securing the governor arms. Fig. 8 is a top or plan view of the governor. Fig. 8$^a$ is a view showing some details of the construction of the governor. Fig. 9 is a detail of the stop bar. Fig. 10 is a rear elevation of the arrester and locking devices. Fig. 12 is a partial view of a modified form of tabulator index scale.

The object of the attachment is to enable the paper carriage to be moved quickly over certain spaces upon the paper upon which nothing is to be printed and to enable the operator to print the letters or figures following such space in the proper predetermined relation to others of preceding lines, as in the preparing of tables of figures and like work.

In the drawings we have shown our invention applied to a machine in which the ordinary spacing is effected by an escapement wheel of which a single tooth is released to permit the movement of the paper carriage one space on the printing of each letter or figure. This escapement wheel is mounted on a shaft extending longitudinally of the machine, and the said shaft has upon it opposite end a spur pinion meshing with a rack secured to the paper carriage and extending transversely of the machine. These features of the machine are shown in Fig. 3 of the drawings in which E is the escapement wheel, E′ the pawl escapement of usual construction, engaging and controlling the wheel.

$e$ is the shaft on which the escapement wheel is mounted and $e'$ is the pinion which engages the rack F.

Figure 1:
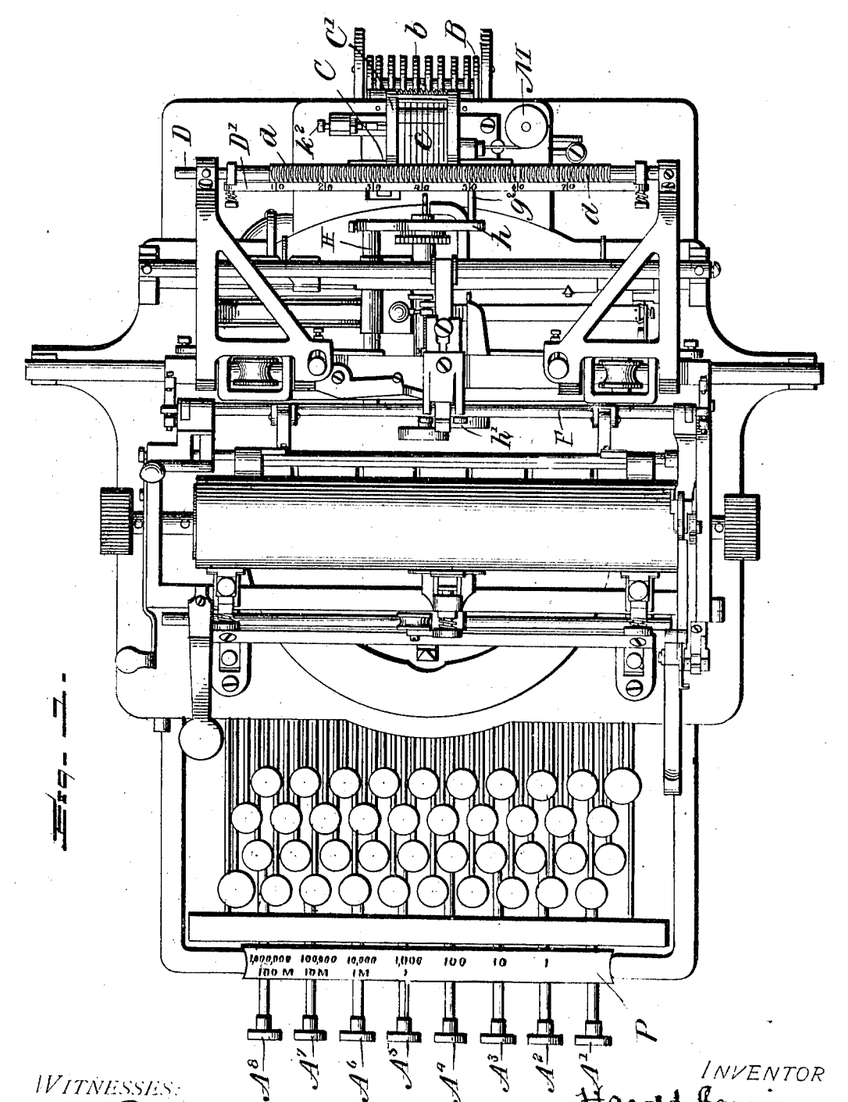
Figure 1 is a top or plan view of a type writing machine with our improved construction applied thereto.
Figure 2:
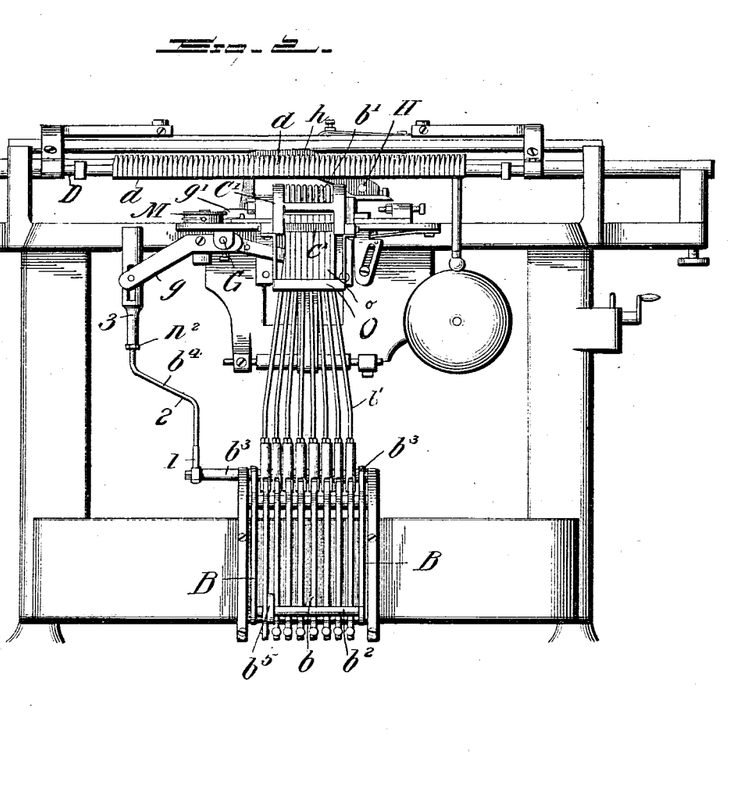
Fig. 2 is a rear elevation of the construction at the rear of the machine.
Figures 6, 7:
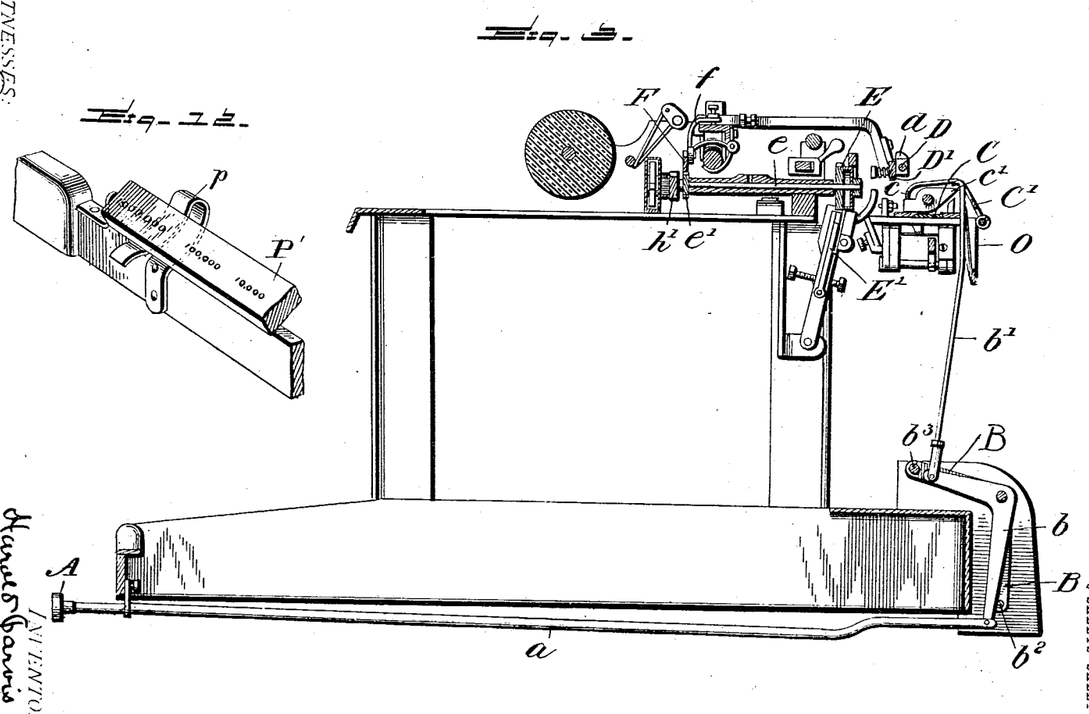
Fig. 7 is a view in elevation of the tabulating speed governor and related parts.
Figures 6, 7, 7A, 8, 9, 10:
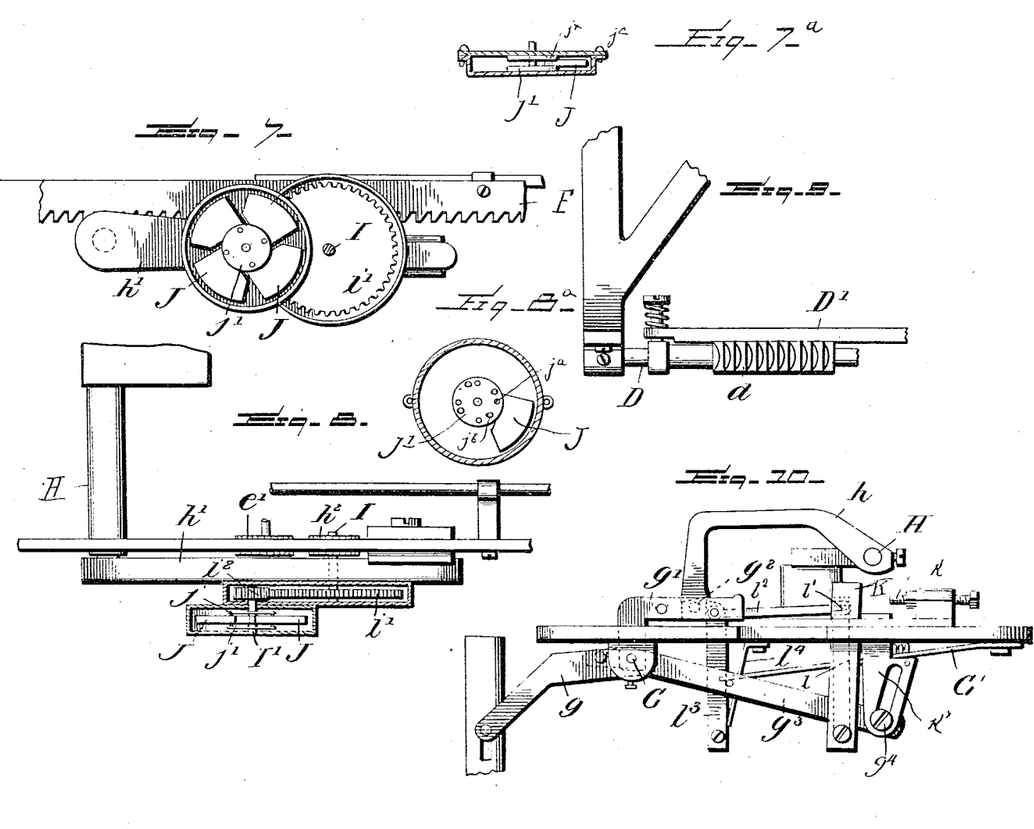

In carrying out our invention, the paper carriage has secured to it a stop bar D (see Figs. 1, 2, 3 and 9). The stops $d$ are pivoted upon this bar and are of the form best shown in Fig. 3. They are pivoted near one end and the opposite end is reduced as shown in Figs. 2 and 9 to enable each stop to be more easily turned upon the bar D independently of the others. When the stops are turned upward as shown in Fig. 2, they are out of operative position. The sides of the stops $d$ are straight and the forward side is engaged by a spring pressed bar D′ which holds the stops from accidental movement. These stops $d$ are of a thickness to correspond to the letter space of the machine. There is one stop for each letter space of the machine and the bar D′ is provided with a scale corresponding to the space scale on the front of the machine. The stops $d$ when turned downward below the bar D are in position to effect the stopping of the paper carriage when other coöperating devices are brought into action. These coöperating devices we will now proceed to describe.

At the front of the machine below the bank of writing keys are a number of push keys A′, A$^2$, A$^3$, A$^4$, A$^5$, A$^6$, A$^7$, A$^8$. These keys are upon the forward ends of rods $a$ $a$ which extend to the rear of the machine where they operatively engage bell crank levers $b$, see Fig. 3. To the forwardly extending ends of the bell crank levers $b$ are pivoted the lower ends of hooks $b'$. These hooks extend upward and their hooked ends project above the rear ends of the pivoted stops or dogs $c'$, $c^2$, $c^3$, &c., mounted on a movable plate or carriage C sliding in a guideway upon a suitable supporting plate. The hooks are normally in such position above these dogs that pressure upon one of the push keys A will cause its connected hook to descend and draw down the rear end of its corresponding dog. The dogs $c'$, $c^2$, $c^3$, &c., are so nearly balanced on their pivotal bar, that they will remain in the position into which they are moved by their actuating hooks, the depressor bar $c$ being removed from contact with them. The forward ends of the dogs $c'$, $c^2$ are engaged and depressed by a depressor bar $c$ which forms part of a pivoted frame C'. This frame has connected with it the spiral spring $c^x$, which tends to move the depressor bar downward and to keep the forward ends of the dogs depressed and their rear ends elevated in close relation to the hooks $b'$.

A bell crank frame B which we denominate the actuating frame, is pivoted concentrically with the bell crank levers $b$. A bar $b^2$ which we term the universal bar, forming a part of this frame extends across and in rear of the vertical portions of the said levers $b$ so that the backward movement of any one of said levers $b$ causes a like movement of the actuating frame B and a forward movement of the bar $b^2$ will cause the forward or return movement of all of the levers $b$ to their normal position. The forwardly extending ends of the side bars of this frame are longer than the forwardly extending arms of the levers $b$ and these arms are connected by a bar or rod $b^3$ which extends to one side of the frame as shown in Fig. 2 and is connected by a link $b^4$ with an arm $g$ of the rock shaft G, which is termed the actuating shaft. This actuating shaft G is also provided with an arm $g'$ the outer end of which extends beneath the depressor bar $c$, so that on rocking the actuating shaft G the said depressor bar is raised out of contact with the dogs $c'$ and allows them to be moved by the hooks $b'$.

Figures 4, 5, 6:
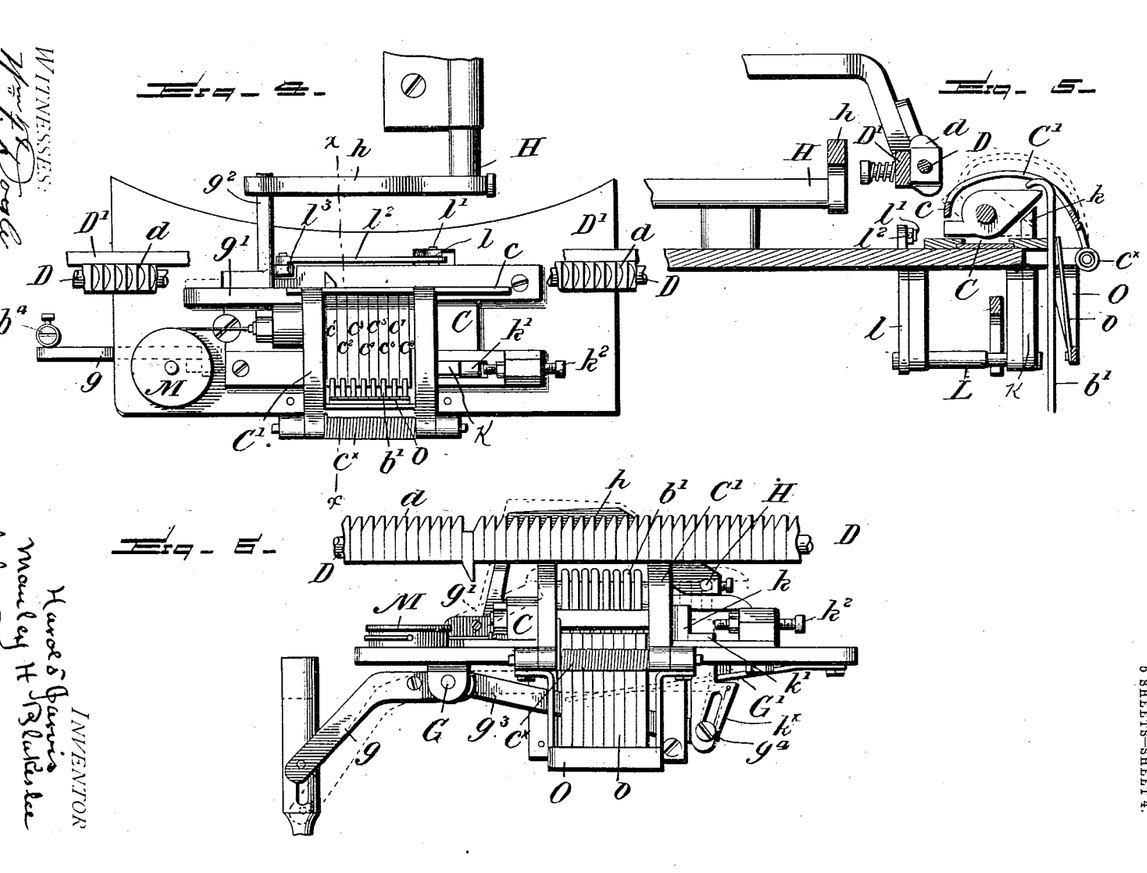
Fig. 4 is a partial plan view showing the movable carriage and coacting parts.
Fig. 5 is a section on line $x$—$x$ of Fig. 4.
Fig. 6 is a rear elevation of the mechanism shown in Fig. 4.

Upon the stationary part or frame of the machine, is mounted a rock shaft H (see Figs. 2, 4 and 10). To the rear end of this rock shaft is secured the arm $h$ the free end of which extends downwardly and rests upon a lug $g^2$ projecting forwardly from the arm $g'$ so that the upward movement of said arm $g'$ serves to partially turn the shaft H. The forward end of this shaft is provided with an arm $h'$ which extends parallel with the rack F. This rack is not rigidly secured to the paper carriage but is mounted to have a slight vertical movement and is normally kept in its depressed position by a spring $f$ (see Fig. 3).

The arm $h'$ of the rock shaft H carries a pinion $h^2$ (see Figs. 7 and 8) below and ordinarily out of engagement with the rack. When, however, the rock shaft H is turned by its arm $h$, the pinion $h^2$ is brought into engagement with the rack F and raises it out of engagement with the pinion $e'$ which permits the paper carriage to be moved by its actuating spring until arrested by the engagement of one of the stops $d$ as hereinafter described. In order that the carriage shall be governed in this movement or so retarded as to avoid too great a blow or jar when its movement is arrested, we provide a retarding device or governor therefor. The pinion $h^2$ is mounted on a shaft I journaled in the arm $h'$ and on its opposite end is mounted a spur gear $i'$ which meshes with a pinion $i^2$ on a shaft I' also carried by the arm $h'$. The opposite end of this shaft I' is provided with two disks $j$ $j'$ between which are pivoted friction levers or arms J. These arms we have made of the shape shown in Fig. 7 and are pivoted to the disks $j$ $j'$ so that as the shaft I' is revolved by the paper carriage the free ends of the same are thrown outward against the casing in which they are housed and retard the movement of the carriage. These arms J may be made of different form should this be found desirable or believed to be advantageous. The greater the movement of the carriage and of the shaft I', the greater the pressure of the arms J against the casing to retard the movement. These arms J are ordinarily of such proportions as to effect the purpose desired, but if greater retardation is desired the position of the arms may be reversed so that their engagement with the casing may tend to turn them farther outward, producing much greater friction and a correspondingly greater retarding action. The casing is desirable but any construction which will supply an exterior friction surface may be substituted.

It will be seen from Fig. 7$^a$ that the arms of the governor are pivoted upon screws $j^x$. Fig. 8 shows the disks $j$ $j'$ provided with two holes $j^a$ $j^b$ for each arm. When the arms are all in the position shown in Fig. 7 one or more of them can at any time be reversed by withdrawing the screws or screw $j^x$ reversing the arm or arms and again pivoting the same on the screw passing through the hole $j^b$ in the disk provided for it. When a closed casing is employed to facilitate this operation the front of the casing should be removably secured by screws $j^c$ as shown in Fig. 7$^a$ or by other preferred means.

The forward end of the right hand dog $c'$ is of greater length than that of any of the other dogs (see Fig. 4) and when the rearward end of this dog is depressed the forward end is raised into a position to engage any one of the stops $d$ which may be turned downward below the bars D. This dog is moved whenever the frame B is actuated. In this instance this is accomplished by providing the lever $b$ which actuates the hook controlling said stop with a loop $b^5$ which embraces the universal rod or bar $b^2$ of the frame, but it might instead be connected directly to some part of the frame B. In this instance the right hand push rod is forked at its rear end and engages the lower end of the lever $b$ connected with the hook which actuates this dog, but it might directly actuate the frame. By this construction the push key and rod remain at rest whenever the frame B is actuated by any of the other keys. When this dog has been actuated by its hook and the paper carriage released from the ordinary feed devices the paper carriage is moved by its spring until a stop $d$ engages the forward end of the dog. The sliding carriage is then moved with the paper carriage until this movement is arrested by devices for effecting this.

As the push key is ordinarily pushed the proper distance and then instantly released, it is necessary that the depressor bar and the rock shaft H shall be maintained in their position during the short interval of time required for the movement of the sliding carriage. To effect this they are locked in this required position by the locking arm $l^3$ which extends upward from a point of pivoting below the plane of the lug $g^2$. The upper end of this arm normally bears against the lug $g^2$ under the force of the spring $l^4$. When the actuating rock shaft G is moved to raise the depressor $c$ and turn the shaft H, as soon as the lug $g^2$ is raised to the position desired the arm $l^3$ passes beneath it and locks the parts in position.

To the upper end of the locking arm $l^3$ is connected one end of a link $l^2$. Mounted on hangers depending below the plane of the sliding carriage is a rock shaft L from one end of which an arm $l$ extends upward and is connected to the link $l^2$ by a pin or screw $l'$ passing through a slot in the link. To the opposite or rear end of the rock shaft L is secured the arm $k$ which may be termed the lever arrester. The arrester $k$ extends upward to such a position that the dogs $c'$, $c^2$ and $c^3$ &c. when in their normal position will pass over it, as most clearly shown in Fig. 5, but when one of said dogs has been depressed by its hook, as the carriage C slides to the left, the depressed end of the dog will strike the arrester and through the rock shaft L and its connection with the locking arm $l^3$, will withdraw said locking arm from beneath the lug $g^2$ permitting the actuating rock shafts G and the rock shaft H to resume their normal positions, thus automatically putting the paper carriage again under the control of the ordinary feeding devices. The sliding carriage is thereafter released by disengaging the dog $c'$ from the stop $d$. This is effected by the depressor $c$ which also at the same time restores all the dogs to their original position. The carriage C is then quickly returned to its normal position by the spring drum M upon which is wound a cord or chain secured to the said carriage. Were the stop $d$ released from the dog $c'$ at the same movement that the unlocking action takes place, the actuating spring of the paper carriage might sometimes act to move it before the rack F had fully engaged the pinion $e'$. In order to make it certain that this shall not occur the depressor is not permitted to act until the downward movement of the rack F is completed. This is accomplished by the movable stop $k^x$. This stop is normally supported by a spring in the position shown in Fig. 6. It is provided with a slot as shown through which a screw or pin $g^4$ secured to the arm $g^3$ passes. This arm $g^3$ is secured to the actuating rock shaft G and moves therewith. When the rock shaft is turned the arm $g^3$ rises carrying the pin $g^4$ upward until the top of the slot is reached when the movable stop is raised a short distance and its upper end interposed between the lever arrester $k$ and the abutment $k^2$. This abutment is here shown as a screw to permit adjustment. When the depressed dog of the sliding carriage C comes in contact with the lever arrester $k$, this latter device is moved a sufficient distance to unlock the shafts G and H and is then brought to a standstill by the movable stop striking the abutment $k^2$. In this position of the parts, the forward end of the dog $c'$ is in contact with the stop $d$ and its rear end or the rear end of one of the other dogs is in contact with the lever arrester $k$, which is rigidly held by the movable stop and the abutment. In this position the actuating spring of the paper carriage draws strongly upon the engaged dogs and the resulting friction is so great that the depressor $c$ cannot move the dogs to effect the release of the carriage C. As soon, however, as the rock shafts G and H are unlocked, these shafts begin to turn and the rack F is lowered upon the ordinary feeding pinion $e'$. At the same time the arm $g^3$ moves downward under the stress of the spring G′ carrying the pin or screw $g^4$ downward in the slot in the movable stop $k^x$ and just after the ordinary feeding devices are put in control of the paper carriage this pin reaches the lower end of the slot and draws down the movable stop to its original position. As soon as this is done, the lever arrester moves toward the abutment and as the carriage is now held by the ordinary feeding devices the pressure on the dogs is relieved and the depressor bar now restores them to their original position.

Figure 11:
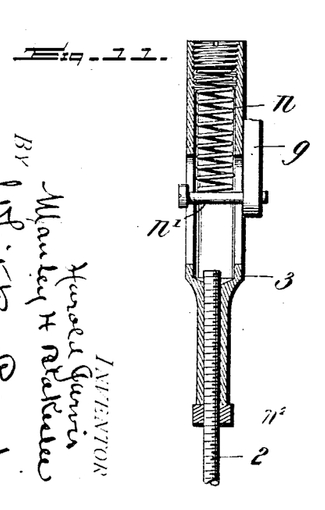
Fig. 11 is a sectional view of the spring connection for operating the actuating rock shaft.

In order that the hooks when in a position of rest may be held out of contact with the dogs $c'$, $c^2$ and $c^3$, &c., and in order that the depressed hook may be slightly raised after completing its movement to permit the free movement of the said dogs and the sliding dog carriage C, we provide a spring connection between the link $b^4$ and the arm $g$. This link is composed of parts 1, 2 and 3. Part 1 is provided with screw threaded socket and opening to engage rod or bar $b^4$. The middle portion 2 is a wire or rod screw threaded at each end. The lower end engages the socket of part 1 and the upper end enters a screw threaded socket in the lower end of part 3. The upper portion of the part 3 is a hollow cylinder in which is located the bearing spring $n$. This spring bears upon the screw or pin $n'$ which passes through the slot in the cylinder and into the arm $g$. The spring $n$ is held in place by the threaded plug in the top of the cylinder and the force of the spring is increased or diminished by turning the plug downward or upward as desired. A jam nut $n^2$ on the part 2 of the link serves to hold the cylinder in the position to which it is adjusted.

The bearing spring $n$ is of sufficient strength to move the frame B and a push rod and its connected parts, but is not as strong as the spring $G'$. The cylinder 3 is adjusted so that when the parts are at rest the pin or screw $n'$ will be at a little distance from the top of the slot, and the hooks a little above and clear of the dogs. When pressure is applied to one of the push rods its bell crank lever and the actuating frame B begin to move drawing the appropriate hook and the link $b^4$ downward compressing the bearing spring $n$. When the upper part of the slot is brought in contact with the pin, the actuating rock shaft G is turned. On releasing the push rod the bearing spring $n$ expands raising the depressed hook slightly above its dog so that it is free to move without friction between them. A depending frame O extends in rear of the hooks $b'$ and a series of springs $o$, one for each hook is secured thereto and bear upon the hooks to hold them in effective relation to the dogs, while permitting a little greater freedom of movement than a rigid guide would.

The operation of our attachment will be understood from the foregoing description, but a brief connected statement of the movement of the parts when used may make it more clear.

When it is desired to print a number or a series of numbers or amounts, the stop $d$ for the units or decimal place is turned downward upon the bar D. If now the right hand push rod A be pressed, the frame B and the right hand hook will be actuated and the rear end of the dog $c'$ depressed. At the same time the depressor bar $c$ will be raised, the rock shaft H partially turned, the rack F engaged and raised by the pinion $h^2$ and the movable stop $k^x$ raised to operative position. The locking arm will also pass beneath the lug $g^2$ locking the rock shafts.

The push key is quickly actuated and instantly released, but as the shafts G and H are locked, the paper carriage begins its movement under the control of the governor, at the same time the spring $n$ expands and moves the frame B and lifts the hook of dog $c'$ a short distance. The paper carriage moves until the stop $d$ strikes the forward raised end of the dog $c'$ imparting motion to the sliding carriage C and the two move in unison until the rearward depressed end of the dog strikes the lever arrester $k$ and forces the movable stop against the abutment $k^2$. In doing this the locking arm or bar is withdrawn and the shafts G and H return to their original positions, restoring the control of the paper carriage to the ordinary feeding devices. As the shaft G nears its position of rest, the movable stop is lowered and the forward end of the dog $c'$ is depressed and the carriage C returned to its normal position. The point on the paper thus reached may be imprinted with a units figure or if decimals alone are to be written with the point and the figures following.

It will be seen that the key $A^2$ will cause the paper carriage to be arrested at the proper point for tens, $A^3$ for the proper point for hundreds, &c. The machine is shown as being provided with eight keys and the carriage provided with eight dogs but this number may be increased or diminished. In case it is desired to insert a comma between the hundreds and thousand places, this can be done by pressing the key to the left of the thousand place desired and putting in the comma before printing the hundreds figure.

The machine is preferably provided with a scale P above the push keys indicating the uses of each key in tabulating figures. In Fig. 1 we show a scale having two lines or series of figures upon it, one for use when the comma is to be inserted between thousands and hundreds and one for use when this is not desired. This scale may be made reversible and have one line or series of indications on one side and one upon the other, and be held by a spring as shown in Fig. 12 in which $P'$ is the scale bar and $p$ the retaining spring. This is our preferred form.

We do not limit ourselves to the exact constructions shown as many parts of the mechanism may be modified to suit the tastes of the different makers without departing from the principle of the invention.

What we claim and desire to secure by Letters Patent is:—

1. A typewriter attachment having a series of auxiliary keys for disengaging the paper carriage from the control of the step-by-step feeding devices, a lock for locking the carriage in this position against any interference from the spacing key and all type keys, a series of dogs for arresting the carriage at varying distances from a predetermined point and devices for automatically unlocking the locking device, substantially as described.

2. A typewriter attachment having a series of dogs movable into and out of operative position, and mechanism for arresting the carriage at varying distances from a predetermined point by the engagement of the carriage with the same dog, substantially as described.

3. A typewriter attachment having a series of stops, and a series of dogs for arresting the carriage at varying distances from a predetermined point by an engagement of the same stop with the same dog, substantially as described.

4. A typewriter attachment having a series of stops one for each letter space of the machine, said stops having each a fixed relation to its letter space but being movable into and out of operative position and stopping mechanism for arresting the carriage by contact with said stops, substantially as described.

5. A typewriter attachment having a series of stops, one for each letter space of the machine, said stops having a fixed relation to its letter space but being movable into and out of operative position and a stopping mechanism provided with a series of dogs for arresting the carriage at varying distances from a predetermined point by the engagement of the same stop with the same dog, substantially as described.

6. A spacing attachment for a typewriter comprising among its members, a series of auxiliary keys to disengage the paper carriage from the step-by-step feeding devices, a series of dogs actuated by said keys, each of which serves to arrest said carriage at a different distance from a predetermined point and one of said dogs adapted to engage with said carriage, substantially as described.

7. A typewriter attachment comprising among its members, a series of auxiliary keys for disengaging the carriage from its step-by-step feeding devices, a series of dogs for arresting the said carriage at varying distances, the lever arrester and connected means for restoring the said carriage to the control of the step-by-step feeding devices, substantially as set forth.

8. An auxiliary spacing attachment for typewriters comprising among its members, a series of auxiliary keys, and connected means for disengaging the carriage from its step-by-step feeding devices, a sliding carriage, a series of dogs mounted on said sliding carriage to cause the paper carriage to engage a certain fixed point of the sliding carriage and to arrest the paper carriage at varying distances, an arrester to restore the paper carriage to the control of its step-by-step feeding devices and to disengage the paper carriage from the sliding carriage, substantially as described.

9. In a typewriter, the combination with means for disengaging the paper carriage from its step-by-step feeding devices, a lock for said means, a movable series of dogs adapted to be put in position to arrest said paper carriage at varying distances the said construction containing provisions by which the said series of dogs may be operatively connected with said carriage and move with it, a depressor for said dogs to restore them to a non-operative position, an arrester to release said lock and a movable stop to permit the said depressor to disconnect said paper carriage and restore the said dogs to a non-operative position, substantially as described.

10. The combination with the paper carriage, of the sliding carriage and its series of dogs, means for connecting the sliding carriage with the paper carriage for effecting a variable feed and means for disengaging the paper carriage including the depressor bar for depressing the series of dogs, substantially as described.

11. The combination with the paper carriage, of the sliding carriage and its series of dogs, means for connecting the paper carriage and the sliding carriage, means for disengaging the paper carriage, including the depressor bar and means to relieve the sliding carriage from the pressure of the paper carriage and its spring, including the slotted movable stop, substantially as described.

12. The combination with the paper carriage, of the sliding carriage and its series of dogs, means for connecting the paper carriage and the sliding carriage by raising one or more of said dogs, means for arresting the movement of said carriages, means for thereafter disconnecting said carriages including the depressor bar and the slotted movable stop and their actuating means, substantially as described.

13. In a typewriter, the combination with means for disengaging the paper carriage from its step-by-step feeding mechanism, means for arresting said paper carriage at varying distances and at the same time restoring the carriage to the control of its step-by-step feeding devices, and means for thereafter disengaging the carriage from its arresting devices, substantially as described.

14. The combination with the series of dogs of the variable spacing mechanism, of a series of hooks for actuating said dogs and the depressor for restoring them to a non-operative position, substantially as described.

15. The combination with the series of dogs of the variable spacing mechanism, of a depressor for returning the said dogs to a non-operative position, a rock shaft provided with an arm for raising said depressor, hooks for actuating said dogs, and means for moving said hooks and rocking said shaft to start said hooks upward before the depressor is released, substantially as described.

16. The combination with the actuating rock shaft, the sliding carriage and its dog, of the depressor adapted to be operated by the actuating rock shaft to depress the said dogs, hooks for raising said dogs, the actuating frame for actuating said hooks, and the link connecting said frame and rock shaft provided with the bearing spring, substantially as described.

17. In a type writer, the combination with the paper carriage, of a variable feeding device including a sliding carriage provided with dogs to arrest the movement of the paper carriage at different predetermined points, hooks for depressing said dogs, said combination including provisions whereby said dogs remain in a depressed position free from interference from the spacing key and all type keys until the sliding dog carriage has reached the limit of its movement and means for returning said sliding dog carriage and hooks to normal position, substantially as described.

18. In a type writer, the combination with a sliding carriage provided with movable dogs, of hooks movable in a vertical direction only for depressing said dogs to arrest the said carriage at different points, the said combination including provisions whereby the said hooks remain out of normal position free from interference from the spacing key and all type keys until the carriage has completed its movement, and means for returning the hooks to normal position, substantially as described.

19. In a typewriter, the combination with a sliding carriage provided with movable dogs, of rods movable in a vertical direction only for bringing said dogs into position to arrest said carriage at different points, said construction embodying provisions whereby said dogs and rods remain in abnormal position during a variable feed movement, substantially as described.

20. In a typewriter having devices for taking the paper carriage from the step-by-step feeding devices and putting it in control of the variable spacing device, push keys, independent of the type keys and spacing key, for operating the transfer devices, means for holding said transfer devices free from interference from the spacing key and all type keys during the variable feed movement, such construction including provisions whereby said push keys remain in the moved position until the carriage is arrested and means for returning the push keys to normal position at the completion of the variable feed movement, substantially as described.

21. In a typewriting and tabulating mechanism, the combination of a power driven carriage, letter feeding devices therefor, a series of column stops, key operated denominational stops and carriage locking mechanism, said construction including provisions whereby the said carriage locking mechanism and the denomination determining mechanism are free from interference from the spacing key and all type keys during the variable feed movement, substantially as described.

22. In a typewriting and tabulating mechanism, the combination of a power driven paper carriage, letter feeding devices therefor, a column stop, a set of denominational stops, a set of independently movable keys for adjusting said denomination stops, a carriage releasing device operable by any of said keys and means operable by said keys for holding said carriage releasing device in abnormal position and out of the control of the spacing key and all type keys, substantially as described.

23. In a typewriter and tabulating machine, the combination of a power driven carriage, escapment devices therefor, a column stop, coöperative stops, means for projecting one of said stops, a carriage releasing device, means for moving said carriage releasing device, means for holding said carriage releasing device in abnormal position, and means for automatically freeing said carriage releasing device from the said holding means, said construction including provisions whereby the said projected stop remains in the moved position until the release of said holding means, substantially as described.

24. In a typewriter and tabulating machine, the combination with the paper carriage, of a step-by-step feeding mechanism normally in operative relation with said carriage, a variable feeding mechanism and governor normally out of operative relation with said paper carriage, means for taking the said paper carriage out of the control of the said step-by-step feeding mechanism and putting it in control of the variable spacing mechanism and governor, and a lock for holding the said carriage in operative relation with said paper carriage during its variable feed, substantially as described.

25. A typewriter and tabulator having a variable feed and governor, key controlled devices for putting the paper carriage into the control of the variable feed and governor and a lock for locking the paper carriage in the control of the governor, substantially as described.

26. A typewriter and tabulator having key controlled devices for taking the paper carriage from the control of the step-by-step feeding devices, and putting it in control of a variable spacing device provided with a governor for regulating the speed of the said carriage, a lock for locking the carriage and governor in operative relation and devices for automatically disengaging said lock, substantially as described.

27. A typewriter and tabulator having key-controlled devices for taking the paper carriage from the control of its step-by-step feeding devices and putting it in the control of a variable spacing device and governor, a lock for locking the paper carriage and governor in operative relation and means whereby the carriage effects the disengagement of the carriage and governor, substantially as described.

28. A typewriter having key controlled devices for taking the paper carriage from the step-by-step feeding devices and putting it in control of a variable spacing device and governor and a lock for locking the paper carriage and governor in operative relation free from all interference from all type keys and the spacing key, substantially as described.

29. In a typewriter the combination with the paper carriage, of a variable feeding device including a sliding carriage provided with dogs to arrest the movement of the said paper carriage at different predetermined points, hooks for bringing said dogs into position to arrest said sliding carriage, said dogs and their actuating parts including provisions whereby said dogs and hooks remain in abnormal position until the sliding dog carriage has reached the limit of its movement and the paper carriage is arrested, substantially as described.

30. In a typewriter, the combination with the paper carriage, of a variable feeding device including a sliding carriage provided with dogs to arrest the said paper carriage at different predetermined points, hooks for operating said dogs, devices for locking said paper carriage free from interference from the spacing key and all type keys during a variable feed movement, means for releasing said locking devices when the paper carriage is arrested and means for returning said sliding carriage and said hooks to normal position, substantially as described.

31. In a typewriter, the combination with the paper carriage, of a variable feeding device including a series of dogs for arresting said carriage at predetermined distances, said dogs being movable with the carriage when operatively engaged by said carriage, a locking device for said carriage during a variable feed movement and means for automatically releasing said locking device when said carriage and dogs are arrested, substantially as described.

32. In a typewriter, the combination with the paper carriage, of a variable feeding device including a series of dogs for arresting said carriage at different predetermined distances, said dogs being movable with said carriage when in operative engagement therewith, means for putting the said dogs into condition to arrest said carriage and to cause one of said dogs to engage with said carriage, a lock for locking said carriage free from interference from the spacing key and all type keys during a variable feed movement, and means for automatically releasing said lock when said carriage and dogs are arrested, substantially as described.

In testimony whereof we affix our signatures, in the presence of two witnesses.

HAROLD JARVIS.
MANLEY H. BLAKESLEE.

Witnesses:
CORA C. DOPFER,
GEORGE E. CARLISLE.

---

Copies of this patent may be obtained for five cents each, by addressing the "Commissioner of Patents, Washington, D. C."